Dec. 31, 1935.  E. F. HUDDLE  2,025,816
BINDER DRIVING MECHANISM
Filed May 3, 1934
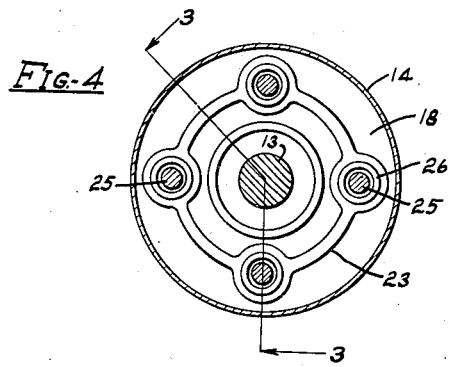
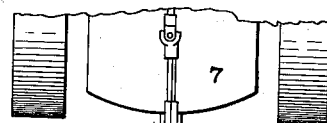
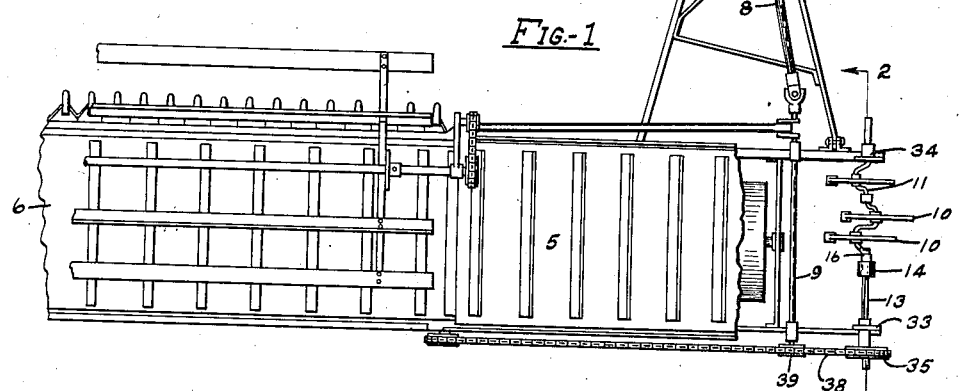
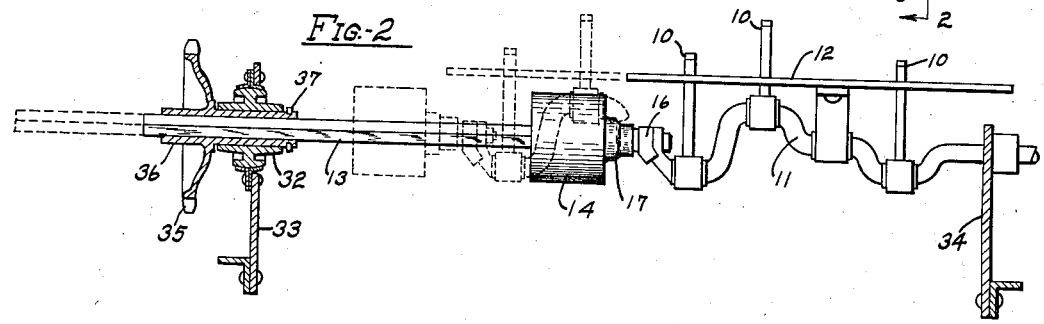
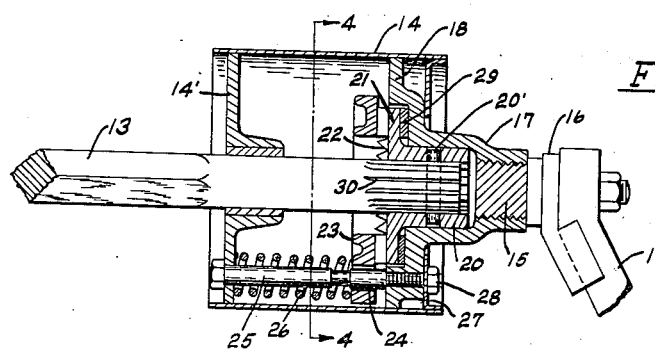
INVENTOR.
EDWIN F. HUDDLE
BY James A. Walsh
ATTORNEY Patented Dec. 31, 1935

2,025,816

UNITED STATES PATENT OFFICE 2,025,816

BINDER DRIVING MECHANISM

Edwin F. Huddle, Rockford, Ill., assignor to J. I. Case Company, Racine, Wis., a corporation Application May 3, 1934, Serial No. 723,716

2 Claims. (Cl. 56—22)

My invention relates to simple and effective driving mechanism for agricultural machines, such as binders, employing parallel driving and driven shafts, my object being to provide the driven shaft with safety means for preventing damage to the binder-head during operation of the machine, occasionally caused by overloading with material or other abnormal conditions, and which means comprises clutch mechanism carried by and rotatable with the driven shaft and shiftable therewith when adjusting the binder-head endwise for the accommodation of grain of different lengths.

In the accompanying drawing, forming part hereof, Figure 1 is a plan view of a tractor drawn binder embodying my improvement; Fig. 2, a detail section taken on the dotted line 2—2 in Fig. 1; Fig. 3, a transverse sectional view of a clutch employed in connection with the packer shaft, taken on the dotted line 3—3 in Fig. 4; and Fig. 4 is a detail section through the clutch taken on the dotted line 4—4 in Fig. 3.

In said drawing the numerals 5, 6, indicate a binder of well known construction adapted to be drawn by a tractor 7, and its various mechanisms actuated by a power take-off shaft 8 on the tractor, as is common, and connected to the drive shaft 9 for operating the packers 10 mounted on a crank-shaft 11 associated with the binding table 12 forming part of and shiftable with the usual binder-head, the latter in entirety and the knotting mechanisms commonly employed not being shown in Fig. 1 for purposes of clearness. The crank-shaft 11 for operating the packers 10 is connected to the binder-head drive shaft 13, forming with the latter a continuous shaft, by means of a clutch enclosed within a casing 14, said clutch comprising an exteriorly threaded coupling 15 suitably connected, at 16, to the crank-shaft 11, upon which coupling is threaded a sleeve 17 extending into the casing 14 and including a flange 18. Within said sleeve is a bearing-clutch member 20 having a flange 21 including teeth 22 adapted to engage similar teeth on a ring-clutch member 23 slidably mounted, at 24, on torque rods 25 each having an expansion spring 26 thereon, said rods extending through and secured to the flange 18 of sleeve 17 by nuts 28. A flange 27 for retaining casing 14 is clamped under the nuts 28, and a friction element 29 is interposed between flanges 21 and 18 to increase driving effort of the clutch. The bearing 20 is broached to receive the splined end 30 of the packer drive-shaft 13, which is secured therein against axial displacement by a pin 20' and extends through the head 14' of the casing 14, and is telescopically mounted in a bearing 32 on the frame 33 of the binder-head, the outer end of crank-shaft 11 to which the shaft section 13 is connected being telescopically mounted in the opposite frame member 34. On the outer end of shaft 13 a sprocket 35 is mounted, including a hub 36 extending into the bearing 32, and prevented from longitudinal displacement by a snap-ring, set screw or other device 37, said sprocket being connected by a chain 38 to the sprocket 39 on driving shaft 9.

From the description it will be understood that the packer shaft comprising the sections 11, 13, connected by the clutch in the manner stated, is capable of axial movement, so that when the binder-head is shifted endwise the square shaft section 13 will telescope through sprocket 35, while the clutch 14 and crank-shaft section 11 with the binder-head follow like movement, as indicated by the dotted lines in Fig. 2, such endwise adjustment being made to accommodate grain of different lengths. Should the binder-head become overloaded or clogged with material, it will be understood that the chain-and-sprocket system connecting the shafts 9—13 continues to rotate the latter through the connection of shaft 9 with the power take-off shaft 8 and as crank-shaft 11 instantly ceases rotation under the abnormal condition stated the teeth 22 of bearing-clutch member 21 will become disengaged from those on clutch member 23, which latter is thrust against springs 26, so that shaft 13 will rotate idly until the clogged material is removed, when springs 26 again urge clutch member 23 into operative engagement with bearing-clutch 21, upon which occurrence crank-shaft 11 and clutch 14 instantly resume rotation with section 13. In the manner stated I provide simple and readily operable means remote from sprocket 35 for clutching and declutching the packer-shaft sections for the purposes stated, and which clutching means are dust-proof and adapted to be installed in a manner to be readily accessible for inspection and repair.

I claim as my invention:

1. Driving mechanism for binders comprising, a crank-shaft having packers thereon and adapted to be slidably mounted on a machine, a drive shaft adapted to be slidably mounted on a machine, means for rotating the drive shaft, and a clutch connecting said shafts comprising a coupling secured to the crank-shaft, a sleeve on the coupling, a bearing-clutch member in the sleeve and connected to the drive shaft, a ring-clutch member engageable with the bearing-clutch, torque rods extending through the ring-clutch and bearing-clutch, and yielding means on said rods for engaging the ring-clutch with the bearing-clutch after said clutch members have been declutched.

2. Driving mechanism for binders comprising, a crank-shaft having packers thereon and adapted to be slidably mounted on a machine, a drive shaft adapted to be slidably mounted on a machine, a clutch member on the inner end of the crank-shaft, a clutch member on the inner end of the drive shaft engageably and releasably connected to the first mentioned clutch member, a casing enclosing the clutch members, a sprocket through which the drive shaft is axially adjustable, and means for actuating the sprocket to normally rotate the shafts and clutch assembly simultaneously and whereby under abnormal conditions the clutch members will become disengaged so that the drive shaft will continue rotation and the crank-shaft discontinue rotating.

EDWIN F. HUDDLE.